(12) United States Patent
Ito

(10) Patent No.: US 11,614,799 B2
(45) Date of Patent: Mar. 28, 2023

(54) DISPLAY CONTROL APPARATUS AND NON-TRANSITORY COMPUTER READABLE MEDIUM

(71) Applicant: FUJIFILM Business Innovation Corp., Tokyo (JP)

(72) Inventor: Atsushi Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/224,138

(22) Filed: Apr. 7, 2021

(65) Prior Publication Data

US 2022/0083133 A1 Mar. 17, 2022

(30) Foreign Application Priority Data

Sep. 16, 2020 (JP) .............................. JP2020-155079

(51) Int. Cl.
*G06F 3/01* (2006.01)
*G06V 20/52* (2022.01)
*G06Q 30/0251* (2023.01)

(52) U.S. Cl.
CPC .............. *G06F 3/013* (2013.01); *G06V 20/53* (2022.01); *G06Q 30/0261* (2013.01)

(58) Field of Classification Search
CPC ........................... G06Q 30/0241; G06V 20/53
See application file for complete search history.

(56) References Cited

U.S. PATENT DOCUMENTS

| 2011/0296287 A1* | 12/2011 | Shahraray | G06Q 30/0261 |
| | | | 715/202 |
| 2017/0345044 A1* | 11/2017 | Prandoni | G06Q 30/0236 |

FOREIGN PATENT DOCUMENTS

| JP | 2009277097 | 11/2009 |
| JP | 2013-164431 | 8/2013 |

* cited by examiner

*Primary Examiner* — Mark Edwards
*Assistant Examiner* — Chayce R Bibbee
(74) *Attorney, Agent, or Firm* — JCIPRNET

(57) ABSTRACT

A display control apparatus includes a processor configured to: obtain detection information from a detector that detects a user; obtain a movement mode of the user based on the detection information; estimate a being time during, which the user is in a predetermined viewing area of a display apparatus based on the movement mode; and control display of video data displayed on the display apparatus so that a playback time of the video data becomes less than or equal to the being time.

14 Claims, 9 Drawing Sheets

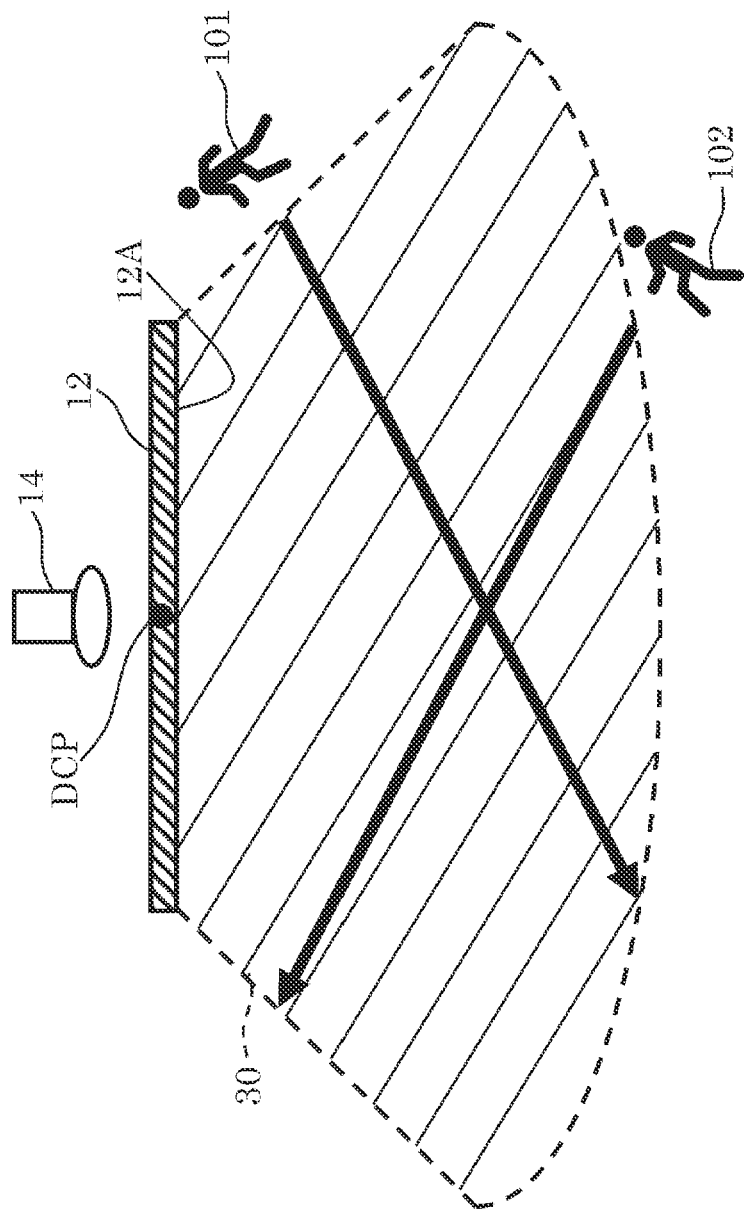

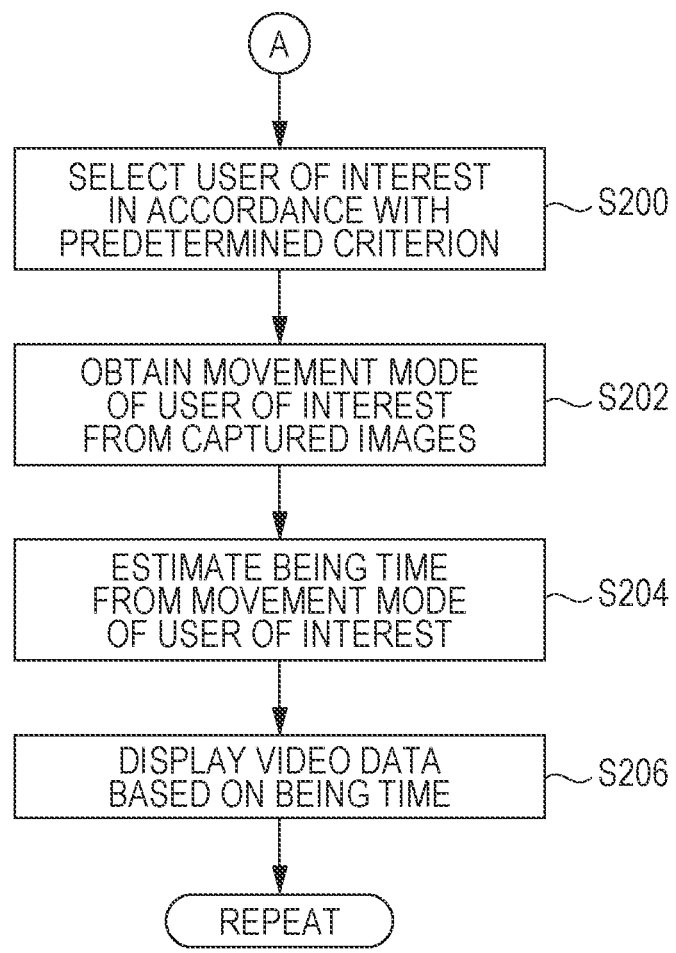

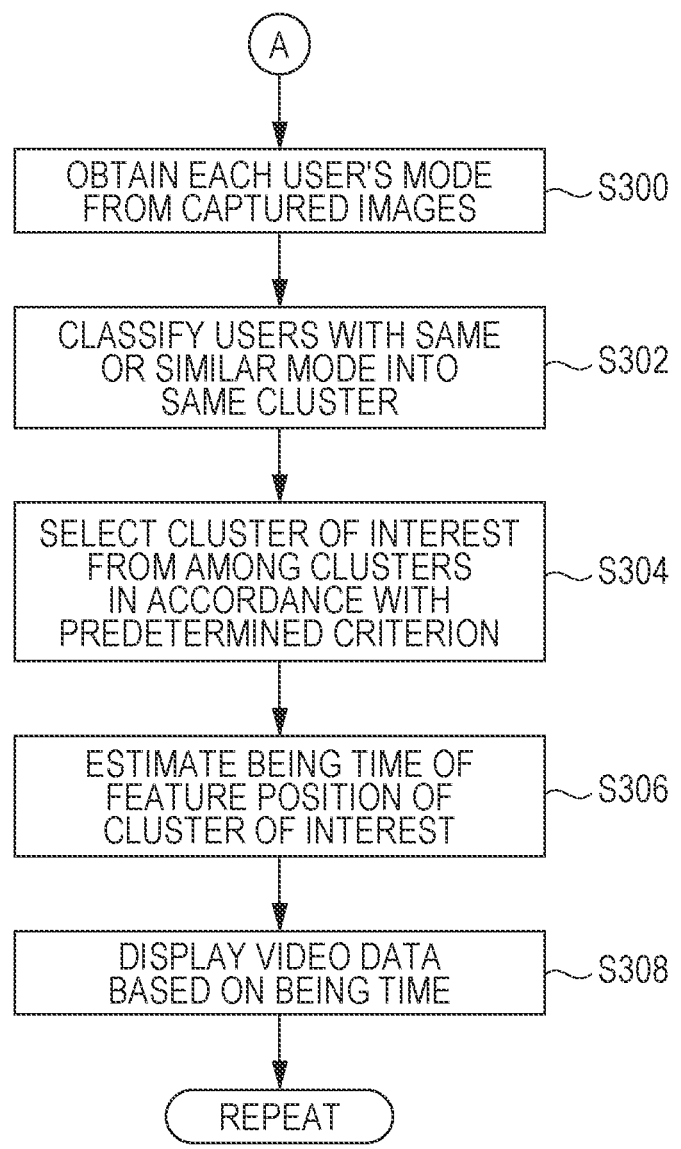

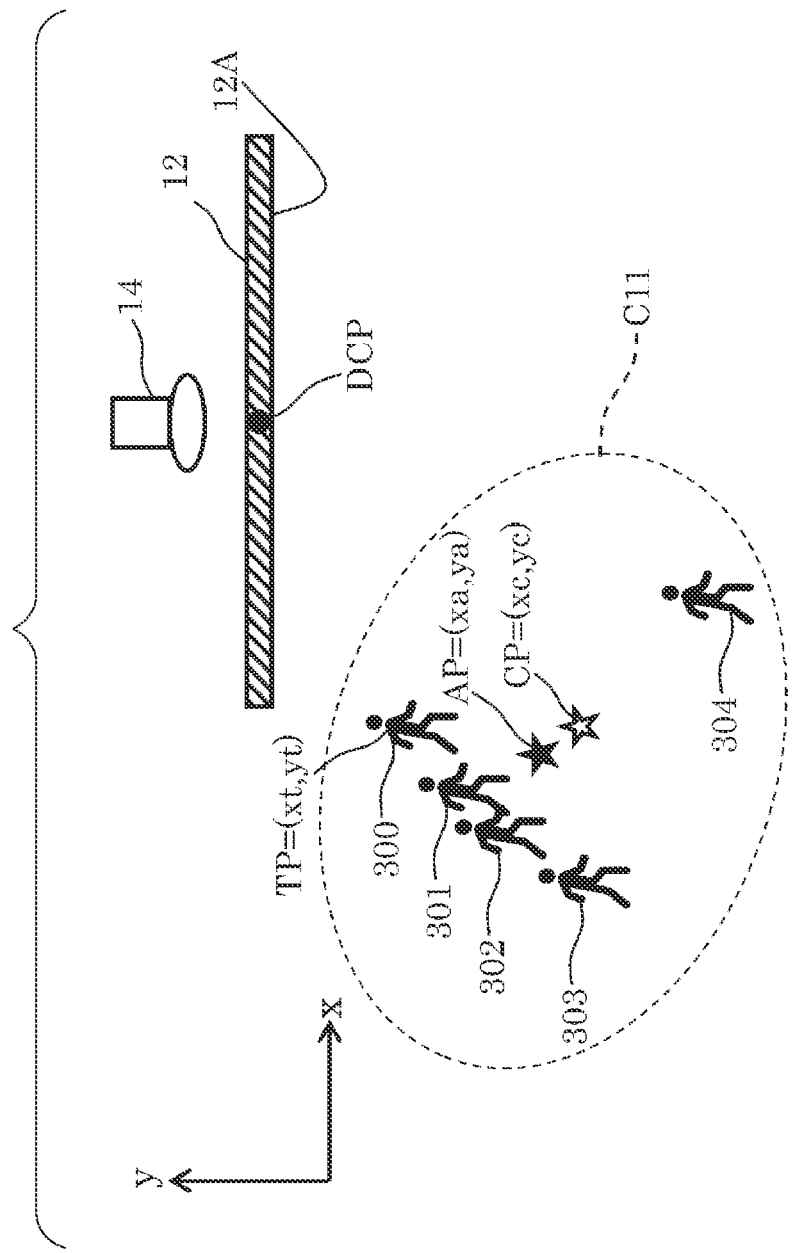

DISPLAY CONTROL APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-155079 filed Sep. 16, 2020.

BACKGROUND

(i) Technical Field

The present disclosure relates to a display control apparatus and a non-transitory computer readable medium.

(ii) Related Art

Hitherto, display apparatuses that display video data such as advertisements have been arranged on the walls or buildings, passages of stations and shopping malls, etc.

Japanese Unexamined Patent Application Publication No. 2009-277097 discloses technologies as follows: detecting the position of a person with respect to a display apparatus by using a sensor, and changing the display position of an advertisement on the display apparatus on the basis of the detected position of the person; and detecting whether the person is moving closer to or away from the display apparatus by using the sensor, and, in the case where the person is moving closer to the display apparatus, reducing the size of characters displayed on the display apparatus, compared to the case in which the person is moving away from the display apparatus.

Japanese Unexamined Patent Application Publication No. 2013-164431 discloses technologies as follows: detecting the movement speed of a person who is around a display; and displaying a still image on the display in the case where the detected movement speed is greater than or equal to a predetermined speed threshold, and displaying a video image on the display in the case where the detected movement speed is less than the predetermined speed threshold.

By the way, depending on a user's movement mode with respect to a display apparatus, the user may not be able to see the entirety of video data displayed on the display apparatus.

SUMMARY

Aspects of non-limiting embodiments of the present disclosure relate to allowing a user to see the entirety of video data displayed on a display apparatus, compared to the case of not taking into consideration the user's movement mode with respect to the display apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display control apparatus including a processor configured to: obtain detection information from a detector that detects a user; obtain a movement mode of the user based on the detection information; estimate a being time during which the user is in a predetermined viewing area of a display apparatus based on the movement mode; and control display of video data displayed on the display apparatus so that a playback time of the video data becomes less than or equal to the being time.

BRIEF DESCRIPTION OF THE DRAWINGS

Exemplary embodiments of the present disclosure will be described in detail based on the following figures, wherein:

FIG. 4 is a diagram for describing the playback time of video data in accordance with each user's movement direction;

FIG. 6 is a flowchart illustrating the flow of display control of video data in the case where a plurality of users are detected;

FIG. 7 is a flowchart illustrating the flow of different display control of video data in the case where a plurality of users are detected;

FIG. 9 is a diagram for describing the feature position of a cluster.

DETAILED DESCRIPTION

Figure 1:
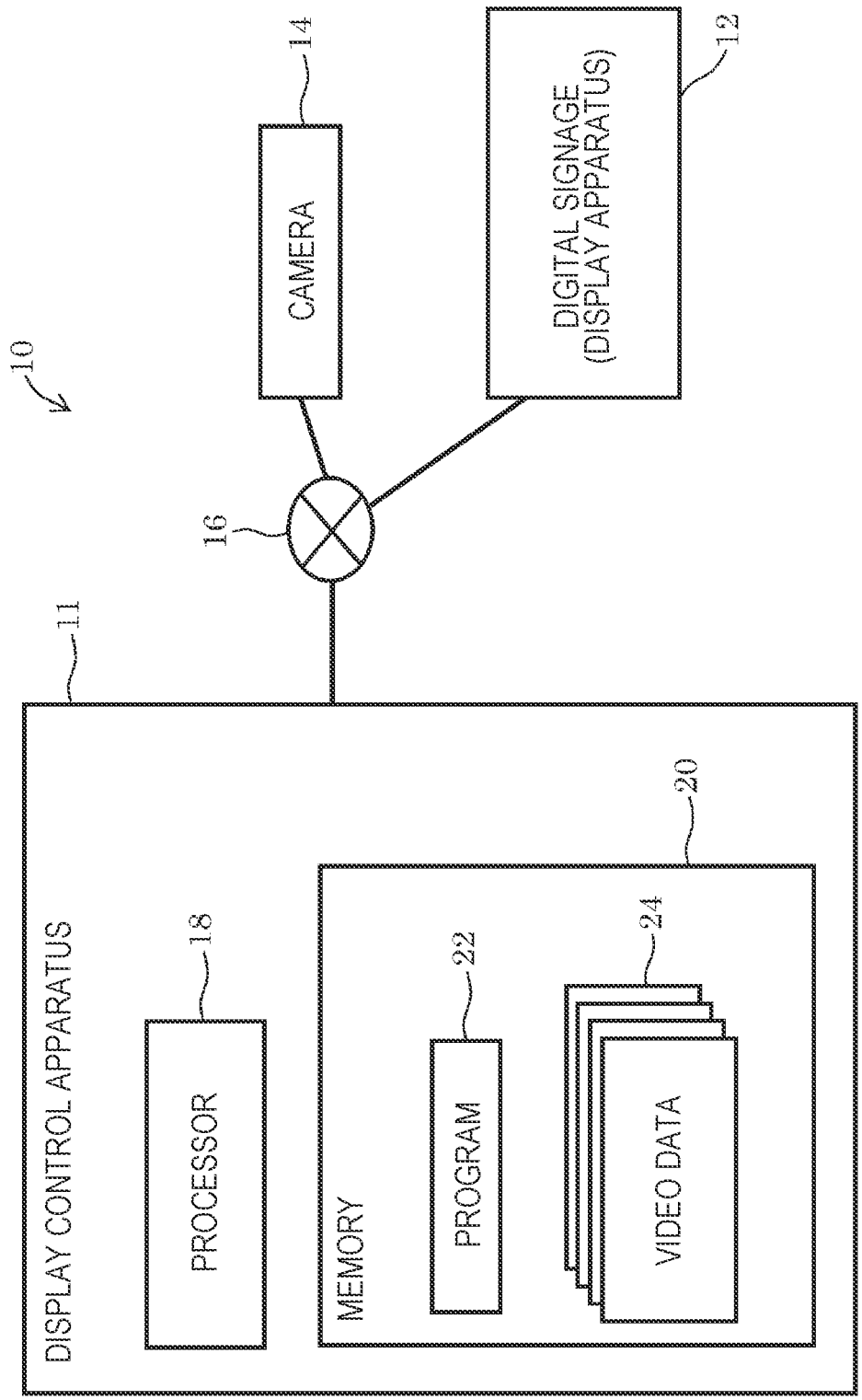
FIG. 1 is a block diagram illustrating an example of the configuration of a display system.

Hereinafter, each exemplary embodiment of the present disclosure will be described in detail with reference to the accompanying drawings. Configurations described below are examples for illustrative purposes only, and may be changed as needed according to the specifications of a system, an apparatus, and the like. In the case where a plurality of exemplary embodiments and modifications are included in the following description, it is assumed from the beginning to use their characteristic portions in appropriate combinations. The same elements are designated by the same reference numerals in all the drawings, and overlapping descriptions are omitted.

FIG. 1 is a block diagram illustrating an example of the configuration of a display system 10. The display system 10 includes the following: a digital signage 12, which displays video data; a display control apparatus 11, which controls display of video data on the digital signage 12; and a camera 14, which serves as a detector. The digital signage 12, the display control apparatus 11, and the camera 14 are connected to a network 16, such as he Internet, so that they may be able to communicate with each other. Note that the digital signage 12, the display control apparatus 11, and the camera 14 may be connected by a dedicated communication line, instead of the network 16. In addition, two or more of the digital signage 12, the display control apparatus 11, and the camera 14 may be combined to form an integrated structure.

The digital signage 12 is a display that serves as a display apparatus. The digital signage 12 is arranged, for example, on the outer wall or inner wall of structures such as public facilities (stations, airports, etc.), commercial facilities, and office buildings, or on the side wall of passages, and displays video data such as advertisements for unspecified people.

Note that the location where the digital signage 12 is arranged is not limited, and video data is not limited to advertisements. Video data may be content including audio or content including no audio. Hereinafter, the digital signage 12 may also be referred to as the display apparatus 12, and a person who may visually recognize video data on the display apparatus 12 may also be referred to as a user.

The display control apparatus 11 is a computer, and includes a processor 18 and a memory 20. The processor 18 includes a central processing unit (CPU), and executes information processing in accordance with a program 22 installed in the display control apparatus 11. Note that the processor 18 may be defined as a computer in a narrow sense. The memory 20 includes read-only memory (ROM), random-access memory (RAM), flash memory, a hard disk drive, and the like, and stores the program 22 executed by the processor 18, a plurality of items of video data 24, and various items of data. The plurality of items of video data 24 include items of video data 24 with different playback times (hereinafter referred to as normal playback times) at a normal speed, which is a predetermined playback speed. The processor 18 reads and plays an item of video data 24 from the memory 20, and displays the video data 24 on the display apparatus 12.

Note that the program 22 executed by the processor 18 of the display control apparatus 11 may be provided not only, via a network such as the Internet, but also by being stored in a computer-readable recording medium such as an optical disc or universal serial bus (USB) memory.

The camera 14 is a camera with a wide-angle lens, and captures images of a predetermined target area to generate captured images as detection information. The captured images are video images with a predetermined frame rate. The camera 14 sends the captured images, which are obtained by capturing images of the target area, to the display control apparatus 11 in real time.

Figure 2:
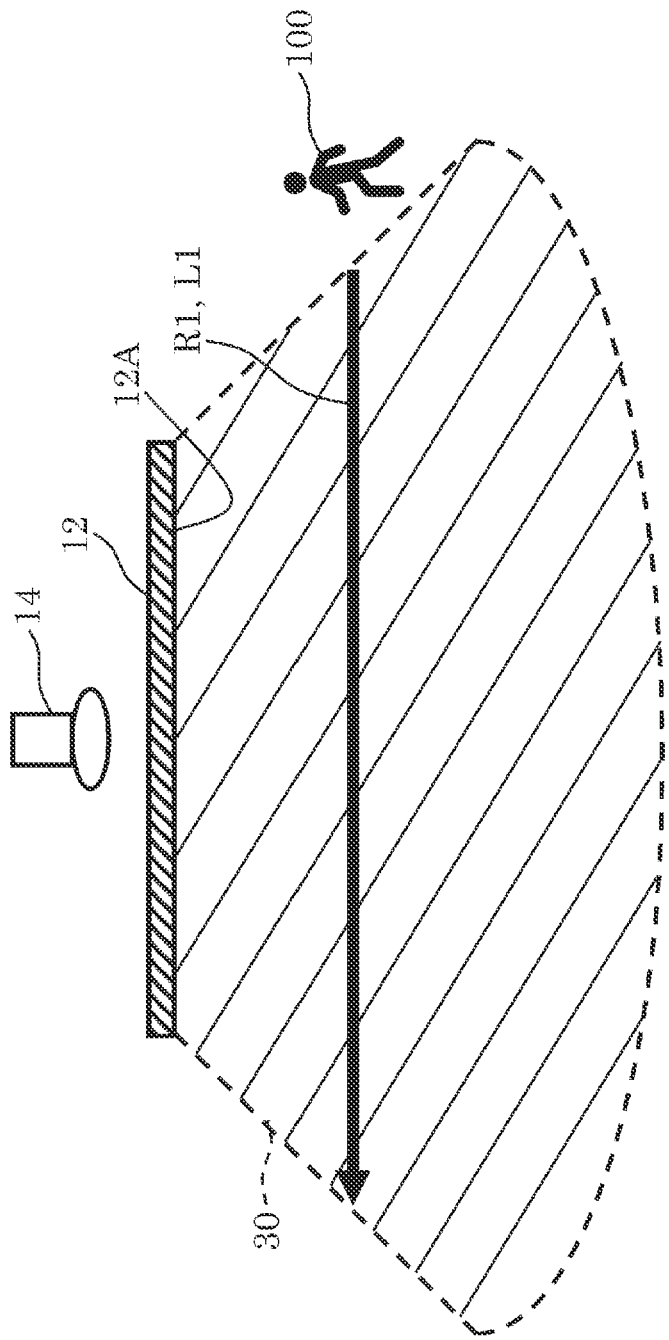
FIG. 2 is a diagram for describing a being time during which a user is in a viewing area.

FIG. 2 and FIGS. 4, 8, and 9 described later are top views of the display apparatus 12, and a display screen 12A of the display apparatus 12 faces downward in these drawings. FIG. 2 illustrates a viewing area 30 which is a predetermined area where the user visually recognizes video data on the display screen 12A. The camera 14 is arranged so as to be able to capture an image of at least a user 100 outside the viewing area 30, who is trying to enter the viewing area 30. In short, the camera 14 captures images of at least the left side, the right side, and the front side of the viewing area 30 viewed from the display screen 12A of the display apparatus 12. For example, as illustrated in FIG. 2, the camera 14 is arranged above the display apparatus 12 and substantially at the center in the width direction (horizontal direction in FIG. 2) of the display screen 12A. Although the camera 14 is drawn to be retracted to the back side of the display apparatus 12 in FIG. 2, when viewed from the top, the camera 14 may be arranged to overlap the display apparatus 12 or to overhang the viewing area 30 side of the display apparatus 12.

In the exemplary embodiment of the present disclosure, the display control apparatus 11 receives captured images from the camera 14, detects a user's movement mode from the captured images, and adjusts the playback time of video data displayed on the display apparatus 12 in accordance with the user's detected movement mode. This allows the user to see the entirety of the content of the video data, while the user's movement mode changes depending on the time of day, the climate, the place where the display apparatus 12 is arranged, how much the surroundings of the display apparatus 12 are congested, and the like.

Figure 3:
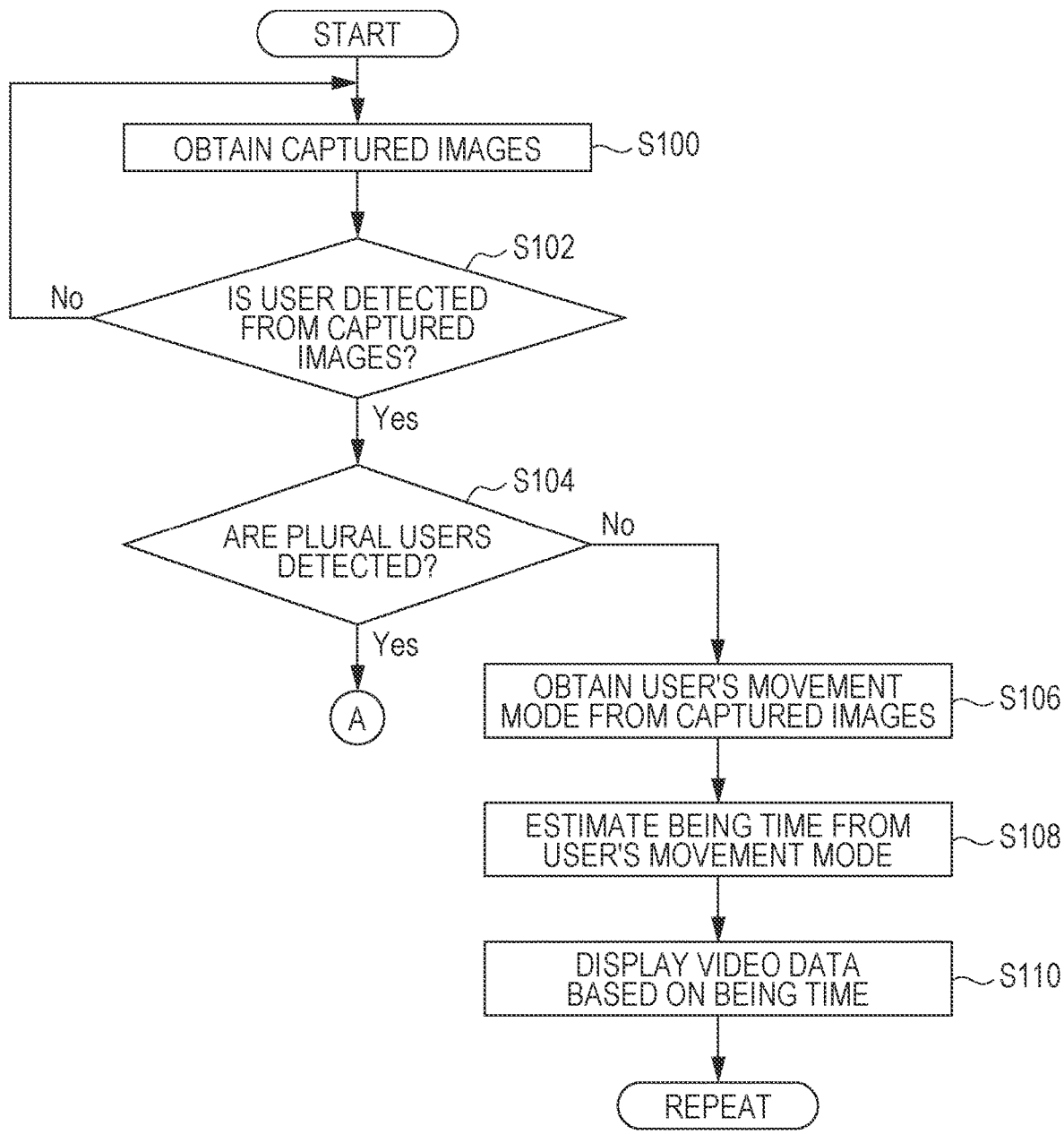
FIG. 3 is a flowchart illustrating the flow of display control of video data.

FIG. 3 is a flowchart illustrating the flow of display control of video data in the exemplary embodiment of the present disclosure. The processor 18 of the display control apparatus 11 reads and executes the program 22 from the memory 20, thereby performing the processing of the flow illustrated in FIG. 3.

At first, in S100, the processor 18 obtains captured images that are sequentially sent from the camera 14. Next, in S102, the processor 18 detects a user who is outside the viewing area 30 by analyzing the captured images. For example, the processor 18 obtains, from a plurality of frame images (hereinafter referred to as frames) constituting each of the captured images, one frame in every predetermined number of frames, and applies pattern matching technology of the related art or the like to the frame, thereby detecting a user from the captured images. The processor 18 repeatedly executes S100 and S102 until a user is detected from the captured images (NO in S102), and, when a user is detected (YES in S102), proceeds to S104.

In S104, the processor 18 checks whether a plurality of users are detected from the captured images. In the case where a plurality of users are detected (YES in S104), the processor 18 proceeds to the flow illustrated in FIG. 6 or FIG. 7. In the case where one user is detected (NO in S104), the processor 18 proceeds to S106.

In S106, the processor 18 obtains the user's movement mode from the captured images. In the present exemplary embodiment, the user's movement mode means the user's position, movement direction, and movement speed with respect to the display apparatus. Because there is, as will be described later, an exemplary embodiment where the average walking speed of a person is used as the user's movement speed, it is defined in the present specification that the user's movement mode is information that at least includes the user's position and movement direction.

The processor 18 obtains, for example, the user's position, which is one type of the user's movement mode, from a reference frame which is a frame where the user is detected. Then, the processor 18 obtains the user's movement direction, which is another type of the user's movement mode, from the reference frame and a subsequent frame which is a frame that follows the reference frame. That is, the processor 18 obtains the user's movement direction from the user's position in the subsequent frame with respect to the user's position in the reference frame. Note that the processor 18 may obtain the user's movement direction by further using one or more frames that follow the subsequent frame. In addition, the processor 18 obtains the user's movement speed, which is yet another type of the user's movement mode, from the time between frames, which is obtained from the frame rate of the captured images, and the user's movement amount, which is the difference between the user's position in the reference frame and the user's position in the subsequent frame. Note that the processor 18 may obtain the user's movement speed by further using one or more frames that follow the subsequent frame.

Next, in S108, the processor 18 estimates a being time during which the user 100 is in the viewing area 30 of the display apparatus 1 on the basis of the user's movement mode. This being time is a time taken by the user 100 to pass the viewing area 30. At first, the processor 18 estimates, as illustrated in FIG. 2, a route R1 taken by the user 100 to pass the viewing area 30 from the position and movement direction of the user 100 obtained in S106. Then, the processor 18 obtains a distance L1 of the route R1. Next, the processor 18 divides the distance L1 by the user's movement speed obtained in S106 to obtain a being time.

Next, in S110, the processor 18 controls display of video data displayed on the display apparatus 12 so that the playback time of the video data becomes less than or equal to the being time estimated in S108. For example, the processor 18 performs control to read, from among a plurality of items of video data 24 with different normal playback times, which are stored in the memory 20 of the display control apparatus 11, video data 24 whose normal playback time is less than or equal to the being time estimated in S108, and display this video data 24 on the display apparatus 12. At this time, the processor 18 estimates, on the basis of the user's position, movement direction, and movement speed obtained in S106, a time which is a time point at which the user 100 enters the viewing area 30, and performs control to start the playback of the video data 24 at or after the estimated time. Accordingly, the playback of the entire video data 24 is completed while the user 100 is in the viewing area 30. By selectively playing video data in this manner, the processor 18 need not perform control to change the playback speed of the video data from a normal speed so that the playback time of the video data becomes less than or equal to the being time.

In addition, for example, the processor 18 may change the playback speed of video data, which is determined in advance as video data to be displayed on the display apparatus 12, from the normal speed so that the playback time of the video data becomes less than or equal to the being time. That is, in the case where the normal playback time of the video data is longer than the estimated being time, the video data fast forwarded to allow the playback of the entire video data 24 to be completed while the user 100 is in the viewing area 30. In doing so, it becomes unnecessary to prepare a plurality of items of video data 24 in the memory 20 of the display control apparatus 11. If the normal playback time of the video data is shorter than the estimated being time, the video data may be played at a slow speed as long as the playback time is less than or equal to the being time.

In addition, for example, the processor 18 may select, from among a plurality of items of video data 24 with different normal playback times, which are stored in the memory 20 of the display control apparatus 11, an item of video data whose normal playback time is closest to the being time, adjust the playback speed on the basis of the difference between the normal playback time of this video data and the being time, and display this video data on the display apparatus 12.

After displaying the entire video data on the display apparatus 12, the processor 18 returns to S100, waits for detection of the next user, and, in response to detection of the next user, plays video data again. Note that the processing in the case where a plurality of users are detected in S104 in FIG. 2 (YES in S104) will be described later.

According to the above-described exemplary embodiment, a user may be allowed to see the entire content of video data, compared to the case of not taking into consideration the user's movement mode. While the movement direction and/or movement speed of a user who is around the display apparatus 12 changes variously depending on the time of day (morning, afternoon, evening, night, or midnight), the climate (sunny, rainy, cloudy, etc.), the season, and the like, an appropriate amount of information (entire video data) perceivable by the user is provided.

As illustrated in FIG. 2, in the case where the user 100 moves along the display screen 12A, the gaze of the user 100 may not be directed to the display screen 12A before the user 100 moves out of the viewing area 30. Therefore, the playback time of the video data may be made ½, ⅔, or ¾ of the being time during which the user 100 is in the viewing area 30.

In the above-described exemplary embodiment, the user's position, movement direction, and movement speed are obtained as the user's movement mode from images captured by the camera 14. However, the user's movement speed need not be obtained from the captured images. For example, the average walking speed of a person may be stored in advance in the memory 20 of the display control apparatus 11, and the processor 18 may read this average speed and use it as the user's movement speed. In the case where the user's movement speed chances depending on, for example, the time of day, the average of the user's movement speed for each time of day, which serves as statistical information, may be stored in advance in the memory 20 of the display control apparatus 11, and the processor 18 may read this average movement speed in accordance with the time of day for playing the video data, and use it as the user's movement speed.

In the above-described exemplary embodiment, the camera 14 captures images of at least the left side, the right side, and the front side of the viewing area 30 viewed from the display screen 12A of the display apparatus 12. However, the camera 14 may capture images of the entire periphery of the viewing area 30 (including the back side of the viewing area 30). In addition, for example, the camera 14 may capture images of one or two predetermined sides among the left side, the right side, and the front side of the viewing area 30 viewed from the display screen 12A of the display apparatus 12.

In the above-described exemplary embodiment, a user outside the viewing area 30 is detected, and playback of video data is started. However, a user inside the viewing area 30 may be detected from images captured by the camera 14, and playback of video data may be started.

After detecting a user and starting the playback of video data, the processor 18 of the display control apparatus 11 may track the user in the viewing area 30 from images captured by the camera 14, and, if the user leaves the viewing area 30 before the playback of the entire video data is completed, may stop the playback of the video data.

In addition, when the user's movement speed is obtained from images captured by the camera 14, if the movement speed is higher than a predetermined threshold, it is likely that the user will not see the video data. Accordingly, the processor 18 of the display control apparatus 11 may not play the video data or may play the video data at a normal speed.

In the above-described exemplary embodiment, the camera 14 is used as a detector for detecting a user and obtaining the detected user's movement mode. However, the detector may be other than the camera 14. The detector may be, for example, laser imaging detection and ranging (LIDAR) or an infrared sensor. In addition, the detector may be a receiving apparatus capable of receiving radio waves transmitted from a mobile terminal apparatus such as a smartphone carried by a user, and, from the reception intensity, detecting the position and movement direction of the user 100. As such technology, there are, for example, a beacon, Bluetooth (registered trademark), and Wi-Fi (registered trademark). The type, combination, number, and location of the detector are not limited as long as a user is detectable and the detected user's movement mode are obtainable on the basis of detection information obtained from the detector.

In the above-described exemplary embodiment, a person is detected and the person's movement mode is obtained from images captured by the camera 14. However, the processor 18 of the display control apparatus 11 may detect a vehicle such as a train or a bicycle on which a person is riding, and obtain the vehicle's movement mode from images captured by the camera 14. The processor 18 may estimate a being time during which there is the vehicle in the viewing area 30 on the basis of the vehicle's movement mode, and may control display of video data displayed on the display apparatus 1 so that the playback time of the video data will be less than or equal to the being time. Note that the display apparatus 12 in this case is a digital signage arranged at a position visible to a user who is riding on the vehicle.

For example, the traveling speed of a train is sometimes slower in the morning than in the afternoon due to the influence of overcrowded timetables during commuting hours, and the traveling speed of an automobile changes depending on the degree of congestion on a road where the automobile travels. To this end, if display of video data is controlled on the basis of the vehicle's movement mode as described above, in the case where the vehicle moves relatively slowly, video data with a longer normal playback time is displayed to provide a user who is riding on the vehicle with a greater amount of information; and, in the case where the vehicle moves relatively fast, video data with a shorter normal playback time is displayed to provide a user who is riding on the vehicle with the entirety of the video data.

In the present specification, "to detect a user" includes detection of a vehicle on which the user is riding; "the user's movement mode" includes the movement mode of a vehicle on which the user is riding; and "a being time during which the user is in the viewing area" includes a being time during which a vehicle on which the user is riding is in the viewing area 30.

Referring next to FIG. 4, control of the playback time of video data on the basis of each user's movement direction will be described. This control related to the specific settings of the playback time of video data in S110 in FIG. 3, and is as follows. The processor 18 of the display control apparatus 11 first obtains the movement directions of users 101 and 102 (see FIG. 4) on the basis of images captured by the camera 14. In the case where, from the obtained movement directions, movement that the user 102 moves closer to the display screen 12A of the display apparatus 12 is detected, compared to the case in which movement that the user 101 moves away from the display screen 12A of the display apparatus 12 is detected, the processor 18 performs control to elongate the playback time of video data displayed on the display screen 12A.

Like the user 101 in FIG. 4, in the case where the user 101 moves in a direction to be away from the display apparatus 12, if the user 101 moves forward through the viewing area 30, it is highly likely that the display screen 12A will become invisible to the user 101 at a relatively early stage. Therefore, in response to detection of the user 101 moving away from the display apparatus 12, the playback time of the video data is made relatively shorter to allow the user 101 to see the entirety of the video data.

In contrast, like the user 102 in FIG. 4, in the case where the user 102 moves in a direction to be closer to the display apparatus 12, if the user 102 moves forward through the viewing area 30, it is highly likely that the display screen 12A will remain visible to the user 102 until a relatively late stage. Therefore, in response to detection of the user 102 moving closer to the display apparatus 12, the playback time of the video data is made relatively longer to allow the user 102 to see the video data with a long normal playback time (a great amount of information).

Figure 5A:
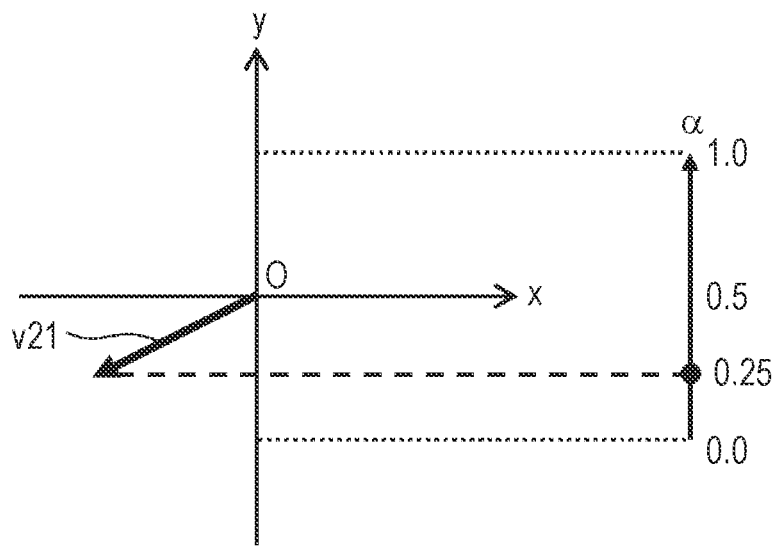
FIG. 5A is a diagram illustrating an example of the vector of a user moving away from a display apparatus.
Figure 5B:
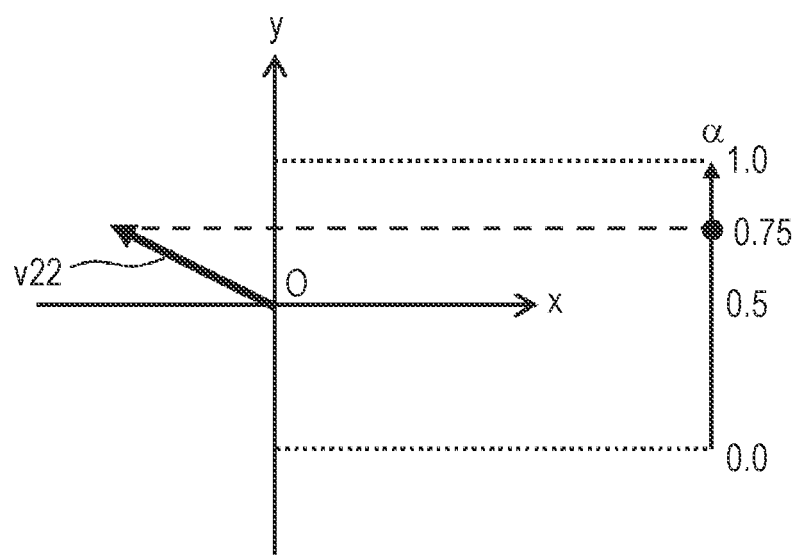
FIG. 5B is a diagram illustrating an example of the vector of a user moving closer to the display apparatus.

This control may be implemented by as follows, for example. FIG. 5A illustrates a vector v21 indicating the movement direction of the user 101 illustrated in FIG. 4, and FIG. 5B illustrates a vector v22 indicating the movement direction of the user 102 illustrated in FIG. 4. Here, as illustrated in FIGS. 5A and 5B, let a direction along the display screen 12A of the display apparatus 12 be the x-axis, a direction orthogonal to the x-axis be the y-axis, and the intersection of the x-axis and the y-axis be the origin O. In addition, the α-axis parallel to the y-axis is defined, and let the position of the origin O on the y-axis be 0.5 (α=0.5) in terms of the component value of the α-axis.

The processor 18 obtains the component value of the α-axis in the case where the magnitude of each of the vectors v21 and v22 is 0.5 and the start point of each of the vectors v21 and v22 is the origin O. Accordingly, the processor 18 obtains α=0.5 in the case where the use movement direction is a direction along the display screen 12A of the display apparatus 12 (x-axis), obtains α<0.5 in the case where the user's movement direction is a direction to be away from the display apparatus 12, and obtains α>0.5 in the case where the user's movement direction is a direction to be closer the display apparatus 12. FIG. 5A illustrates an example where the processor 18 obtains α=0.25, and FIG. 5b illustrates an example where the processor 18 obtains α=0.75.

Using the user's being time to (see S108 in FIG. 3), estimated on the basis of the user's movement mode, and the component value of the α-axis obtained above, the processor 18 calculates the playback time tp of video data using the following equation (1):

$$tp = te \times \alpha \qquad (1)$$

The processor 18 performs control to, for example, read video data 24 whose normal playback time is less than or equal to and closest to the playback time tp obtained using the above equation (1) from the memory 20, and display the video data 24 on the display apparatus 12. In addition, the processor 18 performs control to, for example, adjust the playback speed of video data, which is determined in advance as video data to be displayed on the display apparatus 12, so that the playback time of the video data will become the playback time tp obtained using the above equation (1), and display the video data on the display apparatus 12. Note that the method of determining the component value of the α-axis, which is described using FIGS. 5A and 5B, is only one example. Various methods are adoptable as long as the playback time of video data is adjustable on the basis of the user's movement direction.

In the case where the user's movement direction is such that the component value of the α-axis will be close to 0 (such as α≤0.1) in FIGS. 5A and 5B, it is highly likely that the display screen 12A is invisible to the user. Accordingly, the processor 18 may not play the video data or may play the video data at a normal speed.

Next, exemplary embodiments in the case where a plurality of users are detected from the captured images in S104 in FIG. 3 (YES in S104) will be described. These exemplary embodiments include an exemplary embodiment of selecting a user of interest (see FIG. 6) and an exemplary embodiment of classifying users into clusters and selecting a cluster of interest (see FIG. 7).

At first, the exemplary embodiment of selecting a user interest will be described. FIG 6 is a flowchart in the exemplary embodiment of selecting a user of interest. In the case where a plurality of users are detected from the captured images in S104 in FIG. 3 (YES in S104), in S200 in FIG. 6, the processor 18 of the display control apparatus 11 selects a user of interest from among the plurality of users in accordance with a predetermined criterion.

For example, the processor 18 obtains the gaze direction of each of the detected users by analyzing images captured by the camera 14, and, on the basis of each user's gaze direction, selects a user who directs the user's gaze more to the display apparatus 12 than other users as a user of interest. A user's gaze direction is estimated by, for example, detecting the position of the user's pupil in the captured images. Alternatively, a user's gaze direction is estimated by, for example, detecting the orientation of the user's face in the captured images. Note that "a user who directs the user's gaze more to the display apparatus than other users" is a user that has, as a result of comparison of each user's gaze direction, for example, the user's gaze whose tip is at a position closest to the center DCP (see FIG. 4) in the width direction (horizontal direction in FIG. 4) of the display screen 12A.

In addition, for example, the processor 18 may estimate the attribute of each of the detected users by analyzing images captured by the camera 14, and select a user who has the same or similar attribute to the attribute of a user to which video data displayed on the display apparatus 12 is targeted as a user of interest. The attribute of a user is, for example, the user's sex or age group. The attribute of a user to which video data is targeted is, for example, the sex or age group of a user expected to see the video data. For example, by analyzing the user's face portion or detecting the user's physical constitution such as height in images captured by the camera 14, the processor 18 is able to estimate whether the user's sex is male or female, or whether the user's age group is teens, 20s, 30s, 40s, or the like.

Next, the processor 18 executes processing from S202 in FIG. 6 onward. S202, S204, and S206 are the same processing as S106, S108, and S110 in FIG. 3, respectively. That is, the processor 18 obtains the movement mode of the user of interest from images captured by the camera 14 (S202), estimates a being time during which the user of interest is in the viewing area 30 of the display apparatus 12 on the basis of the movement mode of the user of interest (S204), and controls display of video data displayed on the display apparatus 12 so that the playback time of the video data will be less than or equal to the estimated being time (S206). According to the above-described exemplary embodiment, the user of interest may be allowed to see the entirety of the video data.

Next, the exemplary embodiment of classifying users into clusters and selecting a cluster of interest be described. FIG. 7 is a flowchart in this exemplary embodiment. In the case where a plurality of users are detected from the captured images in S104 in FIG. 3 (YES in S104), in S300 in FIG. 7, the processor 18 of the display control apparatus 11 obtains each user's mode by analyzing the captured images. A user's mode is at least one predetermined type of the user's position, movement direction, movement speed, and attribute.

Figure 8:
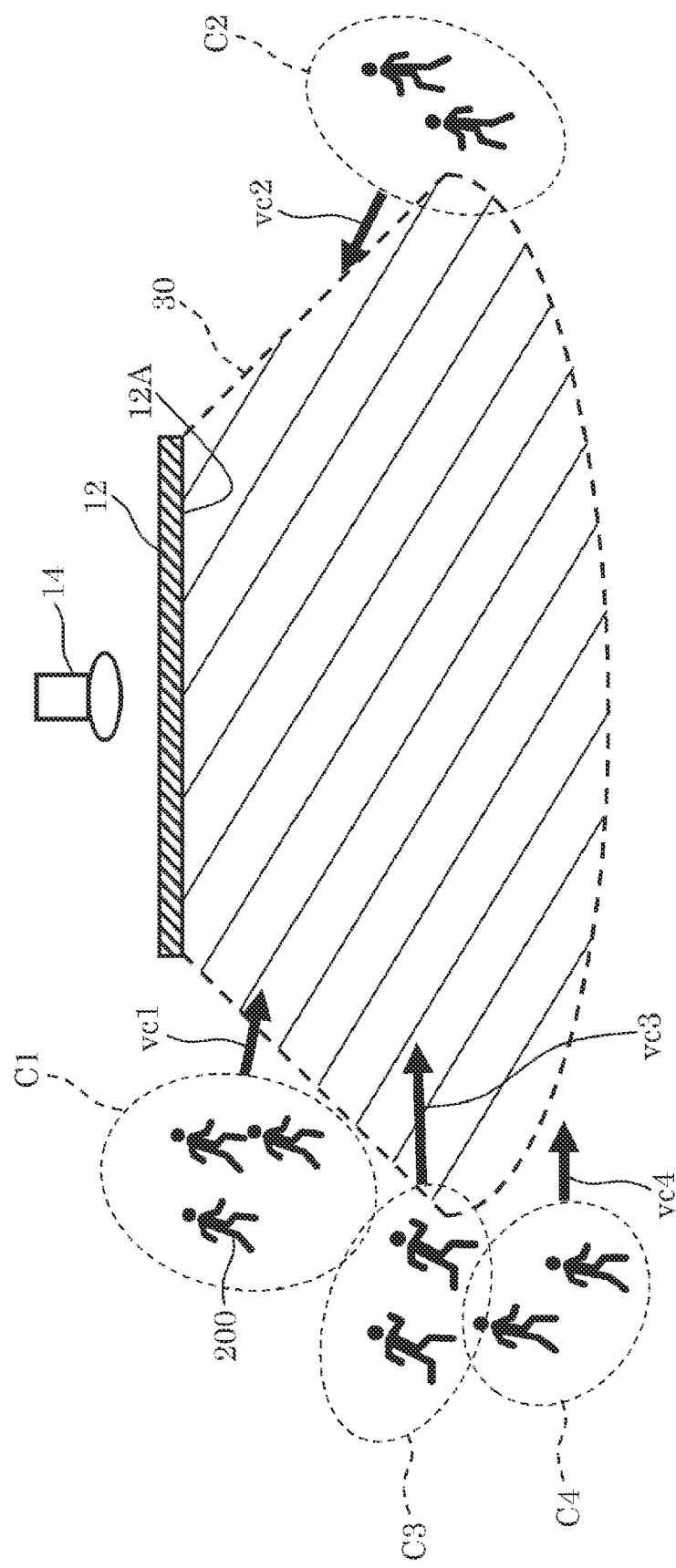
FIG. 8 is a diagram for describing classification of users into clusters.

Next, in S302, the processor 18 classifies, for each user's mode obtained, users who have the same or similar mode into the same cluster. FIG. 8 illustrates an example in which, in S300, the movement direction and the movement speed are obtained as the user's mode; and, in S302, after users who have the same or similar movement direction are classified into the same cluster, these users who have the same or similar movement speed are further classified into the same cluster. Specifically, clusters C1 and C2 are two clusters into which users who have the same or similar movement direction are classified, and clusters C3 and C4 are two clusters into which, after users who have the same or similar movement direction are classified once into the same cluster, these users who have the same or similar movement speed are further classified. In FIG. 8, vc1, vc2, vc3, and vc4 represent the magnitude of the movement speed of the clusters C1, C2, C3, and C4, respectively.

Now, supplementary information will be given on the cluster classification. In the case where only the position of each user is obtained as each user's mode in S300, users who are at close positions may be classified into the same cluster. For example, in the case where the distance between the position of an arbitrarily-defined user and the position of another user is less than or equal to a predetermined threshold, it may be concluded that the arbitrarily-defined user and this other user are at close positions.

Alternatively, in the case where only the movement direction is obtained as each user's mode in S300, users who have the same or similar movement direction may be classified into the same cluster. For example, in the case where an angle formed by, with respect to the movement direction of an arbitrarily-defined user, the movement direction of another user is less than or equal to a predetermined threshold, it may be concluded that the arbitrarily-defined user and this other user have the same or similar movement direction.

Alternatively, in the case where only the movement speed is obtained as each user's mode in S300, users who have the same or similar movement speed may be classified into the same cluster. For example, in the case where the difference between the movement speed of an arbitrarily-defined user and the movement speed of another user is less than or equal to a predetermined threshold, it may be concluded that the arbitrarily-defined user and this other user have the same or similar movement speed.

Alternatively, in the case where only the attribute of each user is obtained as each user's mode in S300, users who have the same or similar attribute may be classified into the same cluster. For example, in the case where sex is obtained as each user's attribute, male users may be classified into one cluster, and female users may be classified into another cluster. Alternatively, for example, in the case where age group is obtained as each user's attribute, users may be classified into different clusters for each of teens, 20s, 30s, 40s, and the like.

Note that users may be classified into clusters in accordance with two or more of each user's position, movement direction, movement speed, and attribute in combinations. Alternatively, only one user may be classified into one cluster.

After S302 in FIG. 7, in S304, the processor 18 selects a cluster of interest from among a plurality of clusters in accordance with a predetermined criterion. For example, the processor 18 selects a cluster including the largest number of users constituting the cluster as a cluster of interest. If this selection method is adopted, the cluster C1 including three users, which is the largest number of users constituting the cluster, is selected as a cluster of interest in the example illustrated in FIG. 8.

Alternatively, for example, in the case where users are classified into clusters on the basis of each user's movement direction in S302, the processor 18 may select, from among a plurality of clusters, a cluster whose movement direction is a direction to be closer to the display apparatus 12 than other clusters as a cluster of interest. Here, a cluster's movement direction may be, for example, the average movement direction, which is the average of the movement directions of the individual users belonging to the cluster. In addition, "a cluster whose movement direction is a direction to be closer to the display apparatus than other clusters" may be defined as a cluster that has, as a result of comparison of each cluster's movement direction, for example, a movement direction whose tip is at a position closest to the center DCP (see FIG. 4) in the width direction (horizontal direction in FIG. 4) of the display screen 12A. If this selection method is adopted, the cluster C2 is selected as a cluster of interest in the example illustrated in FIG. 8.

Alternatively, for example, in the case where users are classified into clusters on the basis of each user's position in S302, the processor 18 may select, from among a plurality of clusters, a cluster whose position is a position closer to the display apparatus 12 than other clusters as a cluster of interest. Note that, as the position of a cluster, for example, a feature position described later may be used. If this selection method is adopted, the cluster C1 is selected as a cluster of interest in the example illustrated in FIG. 8.

Next, in S306 in FIG. 7, the processor 18 estimates a being time during which the feature position of the cluster of interest is the predetermined viewing area 30 of the display apparatus 12. The feature position of the cluster of interest is a predetermined one among the average position of the cluster of interest, the center position of the cluster of interest, and the top position of the cluster of interest with respect to the display apparatus. FIG. 9 illustrates an example of an average position AP of a cluster of interest C11 to which users 300 to 304 belong, a center position CP of the cluster of interest C11, and a top position TP of the cluster of interest C11 with respect to the display apparatus 12. Here, as illustrated in FIG. 9, let a direction along the display screen 12A of the display apparatus 12 be the x-direction, and a direction orthogonal to the x-direction be the y-direction.

The average position AP or the cluster of interest C11 is a position (xa, ya) determined from the average position xa in the x-direction and the average position ya in the y-direction of the users 300 to 304 belonging to the cluster interest C11. The center position CP of the cluster of interest C11 is a position (xc, yc) determined from the center position xc in the x-direction of, among the users 300 to 304 belonging to the cluster of interest C11, two users 303 and 304 at both ends in the x-direction, and the center position yc in the y-direction of two users 300 and 304 at both ends in the y-direction. The top position TP of the cluster of interest C11 with respect to the display apparatus 12 is the position (xt, yt) of, among the users 300 to 304 belonging to the cluster of interest C11, the user 300 at a position closest to the display screen 12A of the display apparatus 12 (the center DCP in the width direction (horizontal direction in FIG. 9) of the display screen 12A).

The processor 18 estimates a being time during which the feature position of the cluster of interest is in the viewing area 30 from the feature position, movement direction, and movement speed of the cluster of interest. Here, the movement direction of the cluster of interest may be, for example, the average movement direction, which is the average of the movement directions of the individual users belonging to the cluster of interest. The movement speed of the cluster of interest may be, for example, the average movement speed, which is the average of the movement speeds of the individual users belonging to the cluster of interest.

Next, in S308, the processor 18 controls display of video data displayed on the display apparatus 12 so that the playback time of the video data becomes less than or equal to the being time estimated in S306.

According to the above-described exemplary embodiment, many users belonging to the cluster of interest may be allowed to see the entirety of the video data. As a result of classification of users into clusters in accordance with each user's attribute in S302, if the cluster of Interest only includes male or female users or users of a particular age group, the processor 18 may selectively play video data that suits the users constituting the cluster of interest. For example, if users belonging to the cluster of interest are only female users, the processor 18 selectively plays video data for women. Alternatively, for example, if users belonging to the cluster of interest are only users of a particular age group, the processor 18 plays video data for that particular age group.

In the embodiments above, the term "processor" refers to hardware in a broad sense. Examples of the processor include general processors (e.g., CPU: Central Processing Unit) and dedicated processors (e.g., CPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. A display control apparatus comprising:
a processor configured to
obtain detection information from a detector that detects a user,
obtain a movement mode of the user based on the detection information, wherein the movement mode of the user comprises a movement direction of the user in a predetermined viewing area of a display apparatus,
estimate a being time during which the user is in the predetermined viewing area of the display apparatus based on the movement mode,
control display of video data displayed on the display apparatus so that a playback time of the video data becomes less than or equal to the being time, and
from the movement direction, in a case in which movement that the user moves closer to the display apparatus is detected, compared to a case in which movement that the user moves away from the display apparatus is detected, perform control to elongate the playback time of the video data.

2. The display control apparatus according to claim 1, wherein the processor is configured to perform control to select video data less than or equal to the being time from among a plurality of items of video data, and to display the video data on the display apparatus.

3. The display control apparatus according to claim 1, wherein the processor is configured to control a playback speed of the video data so that the playback time of the video data becomes less than or equal to the being time.

4. The display control apparatus according to claim 1, wherein the processor is configured to, in response to detection of a plurality of users from the detection information, obtain a movement direction of each of the plurality of users based on the detection information, select a user who moves in a direction to be closer to the display apparatus than another or other users as a user of interest based on the movement direction of each user, and estimate the being time for the user of interest.

5. The display control apparatus according to claim 2, wherein the processor is configured to, in response to detection of a plurality of users from the detection information, obtain a movement direction of each of the plurality of users based on the detection information, select a user who moves in a direction to be closer to the display apparatus than another or other users as a user of interest based on the movement direction of each user, and estimate the being time for the user of interest.

6. The display control apparatus according to claim 3, wherein the processor is configured to, in response to detection of a plurality of users from the detection information, obtain a movement direction of each of the plurality of users based on the detection information, select a user who moves in a direction to be closer to the display apparatus than another or other users as a user of interest based on the movement direction of each user, and estimate the being time for the user of interest.

7. The display control apparatus according to claim 1, wherein the processor is configured to, in response to detection of a plurality of users from the detection information, obtain a gaze direction of each of the plurality of users based on the detection information, select a user who directs the user's gaze more to the display apparatus than another or other users as a user of interest based on the gaze direction of each user, and estimate the being time for the user of interest.

8. The display control apparatus according to claim 2, wherein the processor is configured to, in response to detection of a plurality of users from the detection information, obtain a gaze direction of each of the plurality of users based on the detection information, select a user who directs the user's gaze more to the display apparatus than another or other users as a user of interest based on the gaze direction of each user, and estimate the being time for the user of interest.

9. The display control apparatus according to claim 3, wherein the processor is configured to, in response to detection of a plurality of users from the detection information, obtain a gaze direction of each of the plurality of users based on the detection information, select a user who directs the user's gaze more to the display apparatus than another or other users as a user of interest based on the gaze direction of each user, and estimate the being time for the user of interest.

10. The display control apparatus according to claim 1, wherein the processor is configured to, in response to detection of a plurality of users from the detection information, estimate an attribute of each of the plurality of users based on the detection information, select a user who has a same or similar attribute to an attribute of a user to which video data displayed on the display apparatus is targeted as a user of interest, and estimate the being time for the user of interest.

11. The display control apparatus according to claim 2, wherein the processor is configured to, in response to detection of a plurality of users from the detection information, estimate an attribute of each of the plurality of users based on the detection information, select a user who has a same or similar attribute to an attribute of a user to which video data displayed on the display apparatus is targeted as a user of interest, and estimate the being time for the user of interest.

12. The display control apparatus according to claim 3, wherein the processor is configured to, in response to detection of a plurality of users from the detection information, estimate an attribute of each of the plurality of users based on the detection information, select a user who has a same or similar attribute to an attribute of a user to which video data displayed on the display apparatus is targeted as a user of interest, and estimate the being time for the user of interest.

13. A display control apparatus comprising:
a processor configured to
obtain detection information from a detector that detects a plurality of users,
estimate at least one of a position, a movement direction, a movement speed, and an attribute of each of the plurality of users based on the detection information,
for at least one of the position, the movement direction, the movement speed, and the attribute of each user, classify users who have a same or similar mode into a same cluster,
from among a plurality of clusters, select a cluster including a largest number of users constituting the cluster as a cluster of interest,
estimate a being time during which an average position of the cluster of interest, a center position of the cluster of interest, or a top position of the cluster of interest with respect to a display apparatus is in a predetermined viewing area of the display apparatus, and
control display of video data displayed on the display apparatus so that a playback time of the video data becomes less than or equal to the being time.

14. A non-transitory computer readable medium storing a program causing a computer to execute a process, the process comprising:
obtaining detection information from a detector that detects a user;
obtaining a movement mode of the user based on the detection information, wherein the movement mode of the user comprises a movement direction of the user in a predetermined viewing area of a display apparatus;
estimating a being time during which the user is in the predetermined viewing area of the display apparatus based on the movement mode; controlling display of video data displayed on the display apparatus so that a playback time of the video data becomes less than or equal to the being time; and
from the movement direction, in a case in which movement that the user moves closer to the display apparatus is detected, compared to a case in which movement that the user moves away from the display apparatus is detected, performing control to elongate the playback time of the video data.

* * * * *